United States Patent
Huang et al.

(10) Patent No.: US 12,489,371 B2
(45) Date of Patent: Dec. 2, 2025

(54) RESONANT CONVERTER WITH ADJUSTABLE CAPACITANCE

(71) Applicant: CHICONY POWER TECHNOLOGY CO., LTD., New Taipei (TW)

(72) Inventors: Yu-Chieh Huang, New Taipei (TW); Hsiang-Chueh Meng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 205 days.

(21) Appl. No.: 18/492,322

(22) Filed: Oct. 23, 2023

(65) Prior Publication Data

US 2025/0079998 A1 Mar. 6, 2025

(30) Foreign Application Priority Data

Aug. 29, 2023 (TW) ................................ 112132553

(51) Int. Cl.
*H02M 3/335* (2006.01)
*H02M 3/00* (2006.01)

(52) U.S. Cl.
CPC ......... *H02M 3/33569* (2013.01); *H02M 3/01* (2021.05)

(58) Field of Classification Search
CPC .............................................. H02M 3/335–42
See application file for complete search history.

(56) References Cited

U.S. PATENT DOCUMENTS

| 6,304,007 B1 * | 10/2001 | Yu | H02M 3/07 307/110 |
|---|---|---|---|
| 8,416,596 B2 | 4/2013 | Huang | |
| 9,362,835 B2 | 6/2016 | Xu et al. | |
| 9,484,838 B2 | 11/2016 | Mu et al. | |
| 9,653,985 B2 | 5/2017 | Xu et al. | |
| 2013/0194831 A1 | 8/2013 | Hu | |
| 2024/0079965 A1 * | 3/2024 | Chen | H02M 3/015 |
| 2024/0313659 A1 * | 9/2024 | Shen | H02M 3/01 |

FOREIGN PATENT DOCUMENTS

| CN | 105576977 A | 5/2016 |
|---|---|---|
| CN | 114204817 A | 3/2022 |
| CN | 115036896 A | 9/2022 |

(Continued)

OTHER PUBLICATIONS

Office Action dated Jul. 22, 2024 of the corresponding Taiwan patent application No. 112132553.

*Primary Examiner* — Peter M Novak
(74) *Attorney, Agent, or Firm* — MUNCY, GEISSLER, OLDS & LOWE, P.C.

(57) ABSTRACT

A power converter includes a transformer, a resonant circuit, a first switch, a second switch, and a controller. The transformer includes a primary-side winding and a secondary-side winding. The resonant circuit is coupled to the primary-side winding, and the resonant circuit includes a resonant capacitor and a resonant inductor. The first switch and the second switch are coupled to the resonant circuit. The controller receives an output voltage feedback signal corresponding to an output voltage of the power converter, and controls the first switch and the second switch to be alternately turned on and turned off according to the output voltage feedback signal so as to adjust the output voltage.

15 Claims, 6 Drawing Sheets

(56) References Cited

FOREIGN PATENT DOCUMENTS

| | | |
|---|---|---|
| CN | 115621991 A | 1/2023 |
| TW | M299410 U | 10/2006 |
| TW | 201206039 A | 2/2012 |
| TW | 201517485 A | 5/2015 |
| TW | 201735518 A | 10/2017 |

\* cited by examiner

RESONANT CONVERTER WITH ADJUSTABLE CAPACITANCE

BACKGROUND

Technical Field

The present disclosure relates to a power converter, and more particularly to a power converter with adjustable resonant capacitance.

Description of Related Art

The statements in this section merely provide background information related to the present disclosure and do not necessarily constitute prior art.

The so-called half-bridge direct current (DC) converter is a power conversion structure that converts DC voltage into different DC voltages. The half-bridge DC converter is mainly composed of two switching transistors, that is, switching components that are alternately and repeatedly turned on and turned-off to achieve the purpose of adjusting the voltage output. Moreover, an asymmetric half-bridge converter (AHB converter) has the characteristics of fewer components, switching voltage clamping, and flexible switching, and therefore it is widely used in the field of low-to-medium power conversion. The half-bridge converter is controlled by means of pulse-width modulation (PMW) with asymmetric duty cycle so as to realize the soft switching of the switches of the half-bridge converter.

The asymmetric half-bridge flyback converter (AHB flyback converter) combines the advantages of the primary-side zero-voltage switching of the LLC resonant circuit structure and the wide voltage output of the flyback structure, which is suitable for high switching frequency power conversion applications. In models with multiple output voltages, such as PD (power delivery) models, they are generally designed with the maximum output voltage and maximum output wattage, and therefore once the parameter design of the transformer is fixed, the size of its leakage inductance is also fixed. Therefore, under the design conditions of maximum output voltage and maximum output wattage, the resonant capacitor of AHB can be calculated and designed according to the formula. However, at other output voltages under actual operations, the capacitance of the resonant capacitor cannot meet the required capacitance for the output voltage. Therefore, when the capacitance of the resonant capacitor is insufficient, the efficiency will decrease, the voltage surge of the resonant capacitor will increase, and the resonant current will increase, which will cause damage to the transistors in the AHB structure.

Therefore, how to design a power converter to solve the problems and technical bottlenecks in the existing technology has become a critical topic in this field.

SUMMARY

An objective of the present disclosure is to provide a power converter, and the power converter includes a transformer, a resonant circuit, a first switch, a second switch, and a controller. The transformer includes a primary-side winding and a secondary-side winding coupled to the primary-side winding. The resonant circuit is coupled to the primary-side winding. The resonant circuit includes a resonant capacitor and a resonant inductor, wherein the resonant inductor is composed of a magnetizing inductance and a leakage inductance of the primary-side winding. The first switch and the second switch are coupled to the resonant circuit. The controller receives an output voltage feedback signal corresponding to an output voltage of the power converter, and controls the first switch and the second switch to be alternately turned on and turned off according to the output voltage feedback signal so as to adjust the output voltage.

In one embodiment, the power converter further includes a capacitance adjustment circuit. The capacitance adjustment circuit includes an adjustment capacitor coupled to the resonant capacitor. The controller controls a connection relationship between the adjustment capacitor and the resonant capacitor according to the output voltage feedback signal so as to determine an equivalent resonant capacitance of the resonant circuit.

In one embodiment, when the output voltage increases, the equivalent resonant capacitance is controlled to be decreased. When the output voltage decreases, the equivalent resonant capacitance is controlled to be increased.

In one embodiment, the controller provides a first signal, a second signal, and a capacitance adjustment signal to respectively control the first switch, the second switch, and the capacitance adjustment circuit.

In one embodiment, the capacitance adjustment circuit includes a second capacitor and a third capacitor. The second capacitor is the adjustment capacitor. The third switch is connected to the second capacitor in series to form a series-connected path, wherein the series-connected path is connected to the resonant capacitor in parallel.

In one embodiment, when the third switch is turned off and the resonant circuit is in a resonance operation, a first equivalent resonant capacitance is equal to a capacitance of the resonant capacitor, and a resonant current flows through the resonant capacitor. When the third switch is turned on and the resonant circuit is in the resonance operation, a second equivalent resonant capacitance is equal to an equivalent capacitance of the resonant capacitor and the second capacitor in parallel, and the resonant current respectively flows through the resonant capacitor and the second capacitor.

In one embodiment, when the capacitance of the resonant capacitor and a capacitance of the second capacitor are the same, the second equivalent resonant capacitance is greater than the first equivalent resonant capacitance. When the output voltage is less than a voltage threshold, the equivalent capacitance of the resonant circuit is equal to the second equivalent resonant capacitance. When the output voltage is greater than the voltage threshold, the equivalent capacitance of the resonant circuit is equal to the first equivalent resonant capacitance.

In one embodiment, the capacitance adjustment circuit includes a third capacitor and a fourth switch. The third capacitor is the adjustment capacitor. The fourth switch includes a command end, a first switching end, and a second switching end. The common end is connected to the resonant capacitor, the first switching end is connected to one end of the third capacitor, and the second switching end is connected to the other end of the third capacitor. In one embodiment, when the common end of the fourth switch is connected to the first switching end of the fourth switch and the resonant circuit is in a resonance operation, a first equivalent resonant capacitance is equal to a capacitance of the resonant capacitor, and a resonant current flows through the resonant capacitor. When the common end of the fourth switch is connected to the second switching end of the fourth switch and the resonant circuit is in the resonance operation, a second equivalent resonant capacitance is equal to an equivalent capacitance of the resonant capacitor and the third capacitor in series, and the resonant current respectively flows through the third capacitor and the resonant capacitor.

In one embodiment, when the capacitance of the resonant capacitor and a capacitance of the third capacitor are the same, the first equivalent resonant capacitance is greater than the second equivalent resonant capacitance. When the output voltage is less than a voltage threshold, the equivalent capacitance of the resonant circuit is equal to the first equivalent resonant capacitance. When the output voltage is greater than the voltage threshold, the equivalent capacitance of the resonant circuit is equal to the second equivalent resonant capacitance.

In one embodiment, the capacitance adjustment circuit includes a second capacitor and a third capacitor, a third switch, and a fourth switch. The second capacitor and the third capacitor are the adjustment capacitor. The third switch is connected to the second capacitor in series to form a series-connected path, wherein the series-connected path is connected to the resonant capacitor in parallel. The fourth switch includes a common end, a first switching end, and a second switching end. The common end is connected to the resonant capacitor and the second capacitor, the first switching end is connected to one end of the third capacitor, and the second switching end is connected to the other end of the third capacitor.

In one embodiment, when the third switch is turned off and the common end of the fourth switch is connected to the first switching end of the fourth switch, and the resonant circuit is in a resonance operation, a first equivalent resonant capacitance is equal to a capacitance of the resonant capacitor, and a resonant current flows through the resonant capacitor. When the third switch is turned off and the common end of the fourth switch is connected to the second switching end of the fourth switch, and the resonant circuit is in the resonance operation, a second equivalent resonant capacitance is equal to an equivalent capacitance of the resonant capacitor and the third capacitor in series, and the resonant current respectively flows through the third capacitor and the resonant capacitor. When the third switch is turned on and the common end of the fourth switch is connected to the first switching end of the fourth switch, and the resonant circuit is in the resonance operation, a third equivalent resonant capacitance is equal to an equivalent capacitance of the resonant capacitor and the second capacitor in parallel, and the resonant current respectively flows through the resonant capacitor and the second capacitor. When the third switch is turned on and the common end of the fourth switch is connected to the second switching end of the fourth switch, and the resonant circuit is in the resonance operation, a fourth equivalent resonant capacitance is equal to an equivalent capacitance of the resonant capacitor and the second capacitor in parallel and then the third capacitor in series, and the resonant current flows through the third capacitor and respectively flows through the resonant capacitor and the second capacitor.

In one embodiment, when the capacitance of the resonant capacitor, a capacitance of the second capacitor, and a capacitance of the third capacitor are the same, the third equivalent resonant capacitance is greater than the first equivalent resonant capacitance, the first equivalent resonant capacitance is greater than the fourth equivalent resonant capacitance, the fourth equivalent resonant capacitance is greater than the second equivalent resonant capacitance. When the output voltage is less than a first voltage threshold, the equivalent capacitance of the resonant circuit is equal to the third equivalent resonant capacitance. When the output voltage is greater than the first voltage threshold and is less than a second voltage threshold, the equivalent capacitance of the resonant circuit is equal to the first equivalent resonant capacitance. When the output voltage is greater than the second voltage threshold and is less than a third voltage threshold, the equivalent capacitance of the resonant circuit is equal to the fourth equivalent resonant capacitance. When the output voltage is greater than the third voltage threshold, the equivalent capacitance of the resonant circuit is equal to the second equivalent resonant capacitance.

In one embodiment, the capacitance adjustment circuit includes a second capacitor and a third capacitor, a fourth switch, and a third switch. The second capacitor and the third capacitor are the adjustment capacitor. The fourth switch includes a common end, a first switching end, and a second switching end. The common end is connected to the resonant capacitor, the first switching end is connected to one end of the third capacitor, and the second switching end is connected to the other end of the third capacitor. The third switch is connected to the second capacitor in series to form a series-connected path, wherein one end of the series-connected path is connected to the resonant capacitor, and the other end of the series-connected path is connected to the first switching end and the third capacitor.

In one embodiment, when the third switch is turned off and the common end of the fourth switch is connected to the first switching end of the fourth switch, and the resonant circuit is in a resonance operation, a first equivalent resonant capacitance is equal to a capacitance of the resonant capacitor, and a resonant current flows through the resonant capacitor. When the third switch is turned off and the common end of the fourth switch is connected to the second switching end of the fourth switch, and the resonant circuit is in the resonance operation, a second equivalent resonant capacitance is equal to an equivalent capacitance of the resonant capacitor and the third capacitor in series, and the resonant current respectively flows through the third capacitor and the resonant capacitor. When the third switch is turned on and the common end of the fourth switch is connected to the first switching end of the fourth switch, and the resonant circuit is in the resonance operation, a third equivalent resonant capacitance is equal to an equivalent capacitance of the resonant capacitor and the second capacitor in parallel, and the resonant current respectively flows through the resonant capacitor and the second capacitor. When the third switch is turned on and the common end of the fourth switch is connected to the second switching end of the fourth switch, and the resonant circuit is in the resonance operation, a fourth equivalent resonant capacitance is equal to an equivalent capacitance of the resonant capacitor and the third capacitor in series and then the second capacitor in parallel, and the resonant current respectively flows through the third capacitor and the resonant capacitor, and the second capacitor.

In one embodiment, when the capacitance of the resonant capacitor, a capacitance of the second capacitor, and a capacitance of the third capacitor are the same, the third equivalent resonant capacitance is greater than the fourth equivalent resonant capacitance, the fourth equivalent resonant capacitance is greater than the first equivalent resonant capacitance, the first equivalent resonant capacitance is greater than the second equivalent resonant capacitance. When the output voltage is less than a first voltage threshold, the equivalent capacitance of the resonant circuit is equal to the third equivalent resonant capacitance. When the output voltage is greater than the first voltage threshold and is less than a second voltage threshold, the equivalent capacitance of the resonant circuit is equal to the fourth equivalent resonant capacitance. When the output voltage is greater than the second voltage threshold and is less than a third voltage threshold, the equivalent capacitance of the resonant circuit is equal to the first equivalent resonant capacitance. When the output voltage is greater than the third voltage threshold, the equivalent capacitance of the resonant circuit is equal to the second equivalent resonant capacitance.

In one embodiment, the transformer further includes an auxiliary winding, wherein a turns ratio relationship is between the secondary-side winding and the auxiliary winding, and the auxiliary winding provides an auxiliary voltage that has the turns ratio relationship with the output voltage. The controller receives an auxiliary voltage feedback signal corresponding to the auxiliary voltage, and controls the first switch and the second switch to be alternately turned on and turned off according to the auxiliary voltage feedback signal so as to adjust the output voltage.

In one embodiment, the power converter further includes an output voltage detection circuit. The output voltage detection circuit receives the output voltage and detects the output voltage, and generates the output voltage feedback signal corresponding to the output voltage.

Accordingly, the power converter of the present disclosure has the following features and advantages: 1. since the capacitance of a single resonant capacitor cannot be compatible with the capacitance required by all output voltages, the capacitance adjustment circuit is used to adjust the required capacitance. After the output voltage is detected (that is, the output voltage is known), the capacitance adjustment circuit can be used to connect with the resonant capacitor in parallel, in series, in parallel-series, or in series-parallel to change the equivalent capacitance of the resonant circuit so that the equivalent capacitance of the resonant capacitor required under the output voltage can be designed according to different output voltages; 2. according to the magnitude of the output voltage, the equivalent capacitance of the resonant circuit can be adjusted in real time to have a normal resonant waveform, thereby increasing efficiency, reducing the voltage surge on the resonant capacitor, and reducing the current flowing through the transistors to avoid damage to the transistors.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
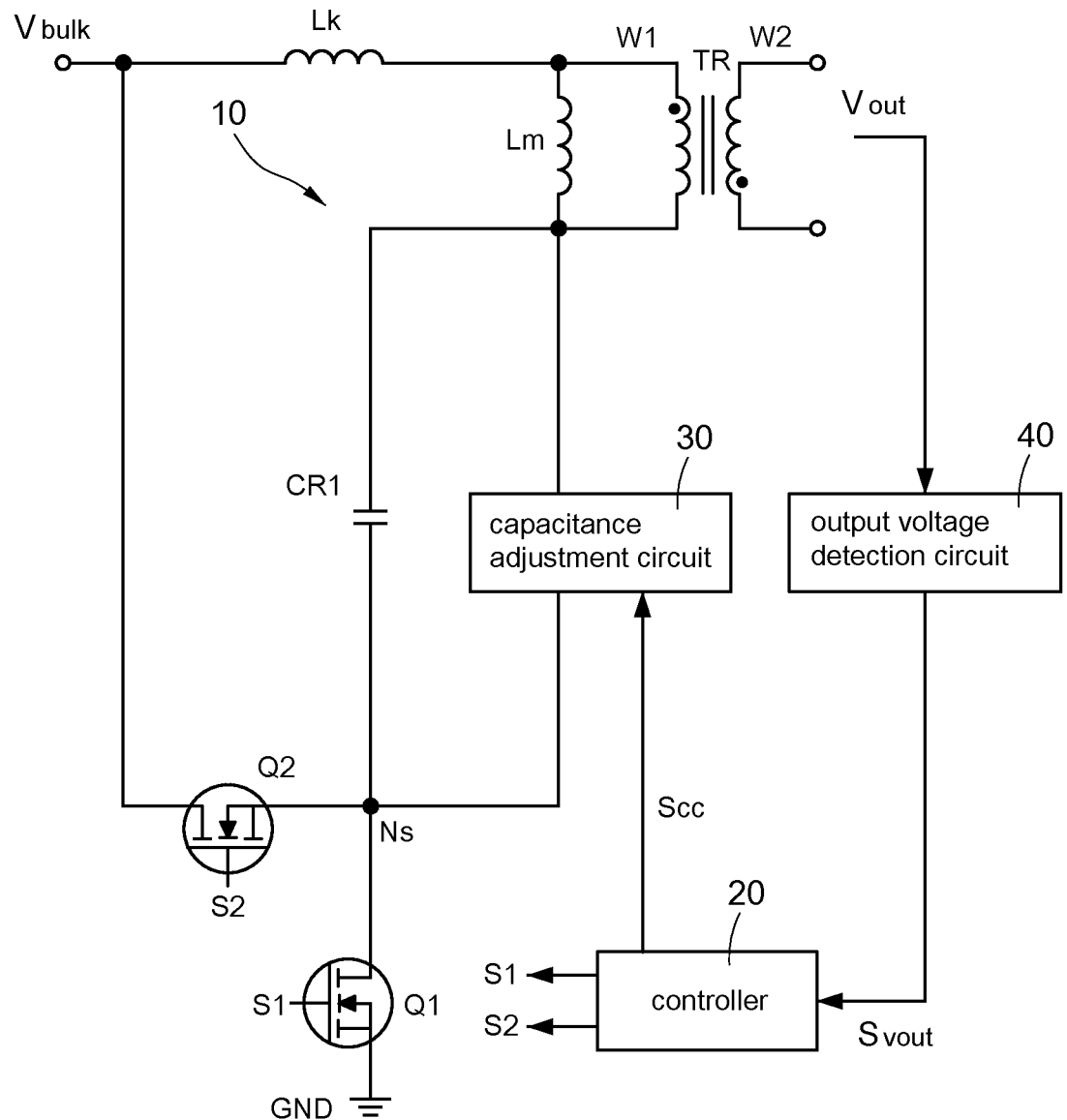
FIG. 1 is a block circuit diagram of a power converter according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power converter according to the present disclosure. The power converter 100 includes a transformer TR, a resonant circuit 10, a first switch Q1, a second switch Q2, and a controller 20. The transformer TR includes a primary-side winding W1 and a secondary-side winding W2 coupled to the primary-side winding W1. The resonant circuit 10 is coupled to the primary-side winding W1. The resonant circuit 10 includes a resonant capacitor CR1 and a resonant inductor, wherein the resonant inductor is composed of a magnetizing inductance Lm and a leakage inductance Lk of the primary-side winding W1. The first switch Q1 and the second switch Q2 are coupled to the resonant circuit 10.

The controller 20 receives an output voltage feedback signal Svout corresponding to an output voltage Vout of the power converter 100, and controls the first switch Q1 and the second switch Q2 to be alternately turned on and turned off according to the output voltage feedback signal Svout so as to adjust the output voltage Vout. In one embodiment, the power converter 100 includes an output voltage detection circuit 40. The output voltage detection circuit 40 receives the output voltage Vout and detects the output voltage Vout, and generates the output voltage feedback signal Svout corresponding to the output voltage Vout.

Figure 6:
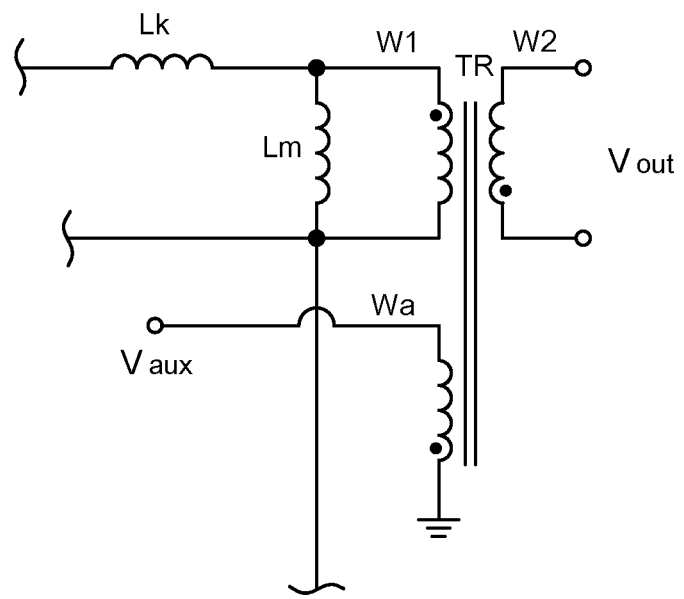
FIG. 6 is a circuit diagram of detecting an auxiliary voltage of the power converter according to the present disclosure.

In addition, as shown in FIG. 6, which shows a circuit diagram of detecting an auxiliary voltage of the power converter according to the present disclosure. In addition to acquiring the output voltage feedback signal Svout through the detected output voltage Vout at the output side of the power converter 100, an auxiliary voltage feedback signal may also be acquired through an auxiliary winding Wa of the transformer TR so as to control the first switch Q1 and the second switch Q2 to be alternately turned on and turned off to adjust the output voltage Vout. Specifically, as shown in FIG. 6, the transformer TR further includes the auxiliary winding Wa, and a turns ratio relationship is between the secondary-side winding W2 and the auxiliary winding Wa, and therefore the auxiliary winding Wa provides an auxiliary voltage Vaux that has the turns ratio relationship with the output voltage Vout. In other words, the controller 20 receives the auxiliary voltage feedback signal corresponding to the auxiliary voltage Vaux, and controls the first switch Q1 and the second switch Q2 to be alternately turned on and turned off according to the auxiliary voltage feedback signal so as to adjust the output voltage Vout. In particular, since the technical spirit of the auxiliary voltage feedback signal is similar to that of the output voltage feedback signal Svout, no more details are given here.

In one embodiment of the present disclosure, the power converter further includes a capacitance adjustment circuit 30. The capacitance adjustment circuit 30 includes an adjustment capacitor (details later), and is coupled to the resonant capacitor CR1. The controller 20 controls a connection relationship between the adjustment capacitor and the resonant capacitor CR1 (details later) according to the output voltage feedback signal Svout so as to determine an equivalent resonant capacitance of the resonant circuit 10. In particular, when the output voltage Vout increases, the equivalent resonant capacitance is controlled to be decreased; conversely, when the output voltage Vout decreases, the equivalent resonant capacitance is controlled to be increased.

As shown in FIG. 1, the controller 20 provides a first signal S1, a second signal S2, and a capacitance adjustment signal Scc to respectively control the first switch Q1, the second switch Q2, and the capacitance adjustment circuit 30. That is, the first signal S1 is used to control turning on and turning off the first switch Q1; the second signal S2 is used to control turning on and turning off the second switch Q2; the capacitance adjustment signal Scc is used to control switching the capacitance adjustment circuit 30 (details later).

Figure 2:
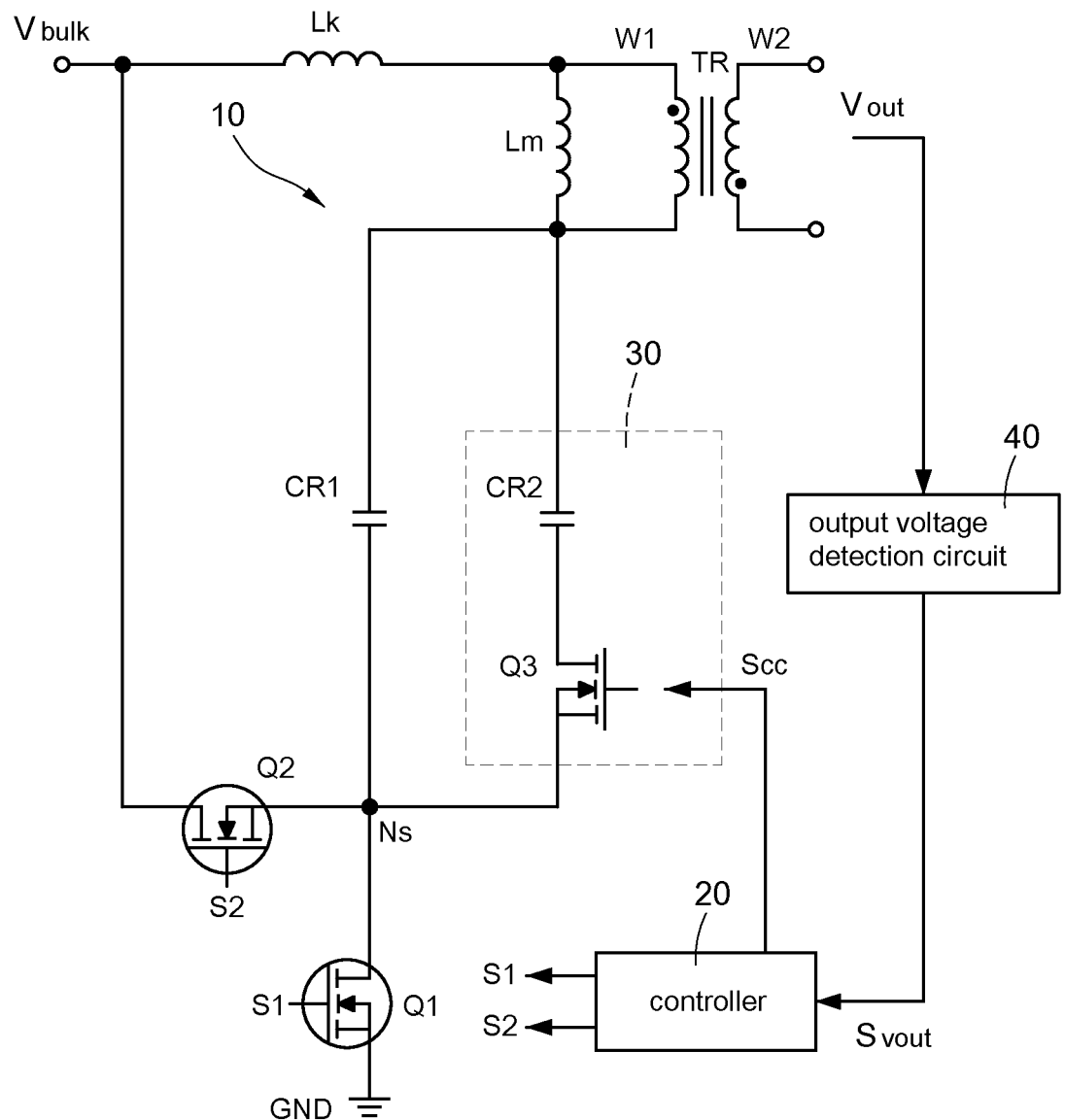
FIG. 2 is a circuit diagram of a capacitance adjustment circuit of the power converter according to a first embodiment of the present disclosure.

Please refer to FIG. 2, which shows a circuit diagram of a capacitance adjustment circuit of the power converter according to a first embodiment of the present disclosure. The capacitance adjustment circuit 30 includes a second capacitor CR2 and a third switch Q3. The second capacitor CR2 is used as the adjustment capacitor. The third switch Q3 is connected to the second capacitor CR2 in series to form a series-connected path, and the series-connected path is connected to the resonant capacitor CR1 in parallel.

When the third switch Q3 is turned off by the capacitance adjustment signal Scc and the resonant circuit 10 is in a resonance operation (however, this is not a limitation, and only the resonance operation of the resonant circuit 10 is executed as an example for illustration), a first equivalent resonant capacitance is equal to a capacitance of the resonant capacitor CR1, and a resonant current flows through the resonant capacitor CR1.

When the third switch Q3 is turned on by the capacitance adjustment signal Scc and the resonant circuit is in the resonance operation, a second equivalent resonant capacitance is equal to an equivalent capacitance of the resonant capacitor CR1 and the second capacitor CR2 in parallel (indicated by the symbol "/", the same will not be repeated below), and the resonant current respectively flows through the resonant capacitor CR1 and the second capacitor CR2.

For the convenience of explanation, in this embodiment, it is assumed that the capacitance of the resonant capacitor CR1 and a capacitance of the second capacitor CR2 are the same, and therefore the second equivalent resonant capacitance (i.e., CR1/CR2) is greater than the first equivalent resonant capacitance (i.e., CR1). When the output voltage Vout is less than a voltage threshold, the equivalent capacitance of the resonant circuit 10 is equal to the second equivalent resonant capacitance; conversely, when the output voltage Vout is greater than the voltage threshold, the equivalent capacitance of the resonant circuit 10 is equal to the first equivalent resonant capacitance. For example, but not limited to, when the output voltage Vout is 36 volts, the capacitance of the resonant capacitor CR1 may be designed as 0.32 uF; when the output voltage Vout is 5 volts, the capacitance of the resonant capacitor CR1 may be designed as 1.04 uF. Therefore, the equivalent capacitance of the resonant circuit 10 can be adjusted in real time in response to the output voltage Vout: when the output voltage Vout becomes larger, the capacitance of the resonant capacitor is adjusted to be smaller; when the output voltage Vout becomes smaller, the capacitance of the resonant capacitor is adjusted to be larger, thereby increasing efficiency, reducing the voltage surge on the resonant capacitor, and reducing the current flowing through the transistors to avoid damage to the transistors.

Figure 3:
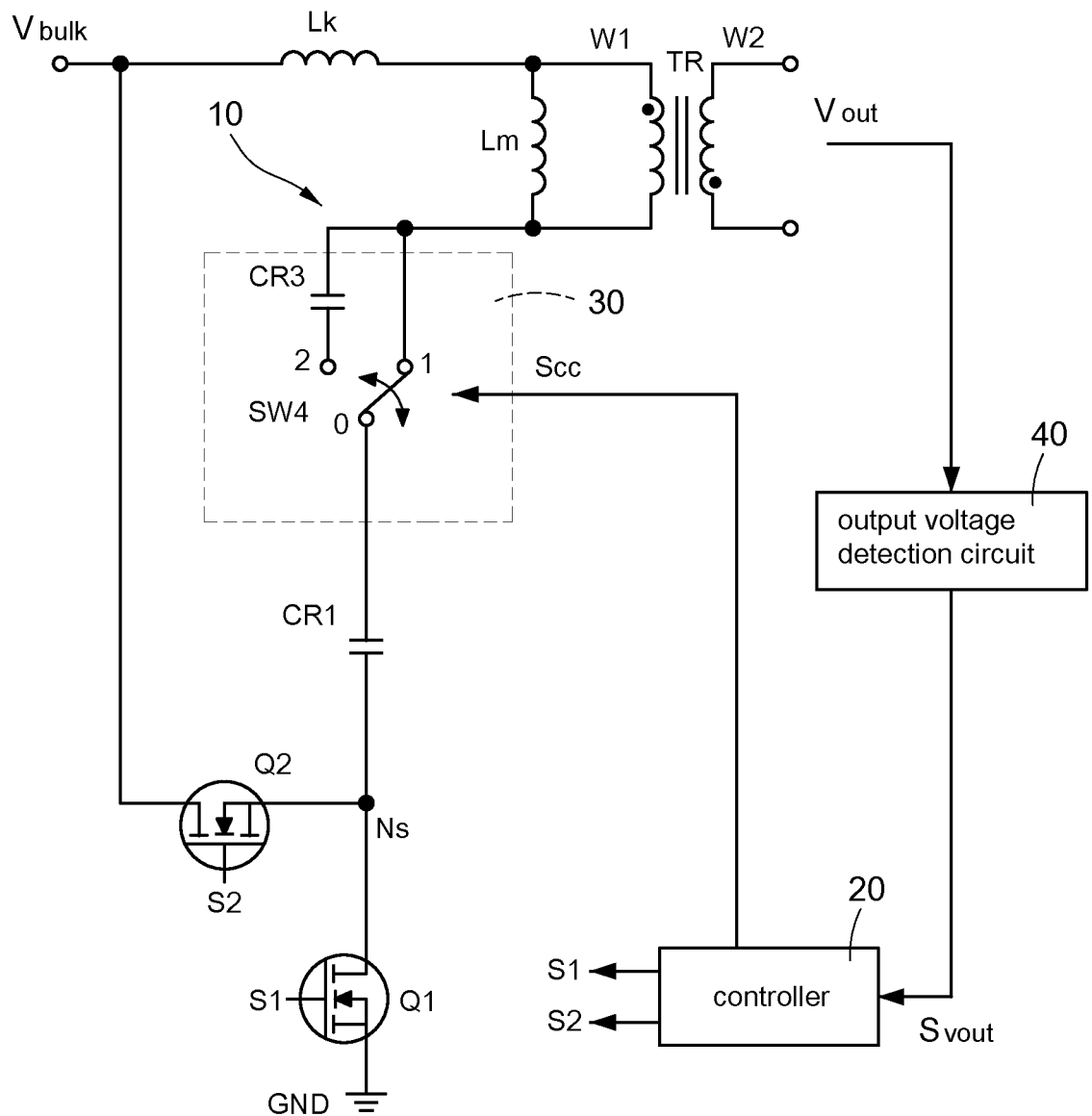
FIG. 3 is a circuit diagram of the capacitance adjustment circuit of the power converter according to a second embodiment of the present disclosure.

Please refer to FIG. 3, which shows a circuit diagram of the capacitance adjustment circuit of the power converter according to a second embodiment of the present disclosure. The capacitance adjustment circuit 30 includes a third capacitor CR3 and a fourth switch SW4. The third capacitor CR3 is used as the adjustment capacitor. The fourth switch SW4 includes a common end 0, a first switching end 1, and a second switching end 2. The common end 0 is connected to the resonant capacitor CR1, the first switching end 1 is connected to one end (near to the magnetizing inductance Lm) of the third capacitor CR3, and the second switching end 2 is connected to the other end (away from the magnetizing inductance Lm) of the third capacitor CR3.

When the common end 0 of the fourth switch SW4 is connected to the first switching end 1 of the fourth switch SW4 by the capacitance adjustment signal Scc and the resonant circuit 10 is in a resonance operation (however, this is not a limitation, and only the resonance operation of the resonant circuit 10 is executed as an example for illustration), a first equivalent resonant capacitance is equal to a capacitance of the resonant capacitor CR1, and a resonant current flows through the resonant capacitor CR1.

When the common end 0 of the fourth switch SW4 is connected to the second switching end 2 of the fourth switch SW4 by the capacitance adjustment signal Scc and the resonant circuit 10 is in the resonance operation, a second equivalent resonant capacitance is equal to an equivalent capacitance of the resonant capacitor CR1 and the third capacitor CR3 in series (indicated by the symbol "+", the same will not be repeated below), and the resonant current respectively flows through the third capacitor CR3 and the resonant capacitor CR1.

For the convenience of explanation, in this embodiment, it is assumed that the capacitance of the resonant capacitor CR1 and a capacitance of the third capacitor CR3 are the same, and therefore the first equivalent resonant capacitance (i.e., CR1) is greater than the second equivalent resonant capacitance (i.e., CR1+CR3). When the output voltage Vout is less than a voltage threshold, the equivalent capacitance of the resonant circuit 10 is equal to the first equivalent resonant capacitance; conversely, when the output voltage Vout is greater than the voltage threshold, the equivalent capacitance of the resonant circuit 10 is equal to the second equivalent resonant capacitance. Therefore, the equivalent capacitance of the resonant circuit 10 can be adjusted in real time in response to the output voltage Vout: when the output voltage Vout becomes larger, the capacitance of the resonant capacitor is adjusted to be smaller; when the output voltage Vout becomes smaller, the capacitance of the resonant capacitor is adjusted to be larger, thereby increasing efficiency, reducing the voltage surge on the resonant capacitor, and reducing the current flowing through the transistors to avoid damage to the transistors.

Figure 4:
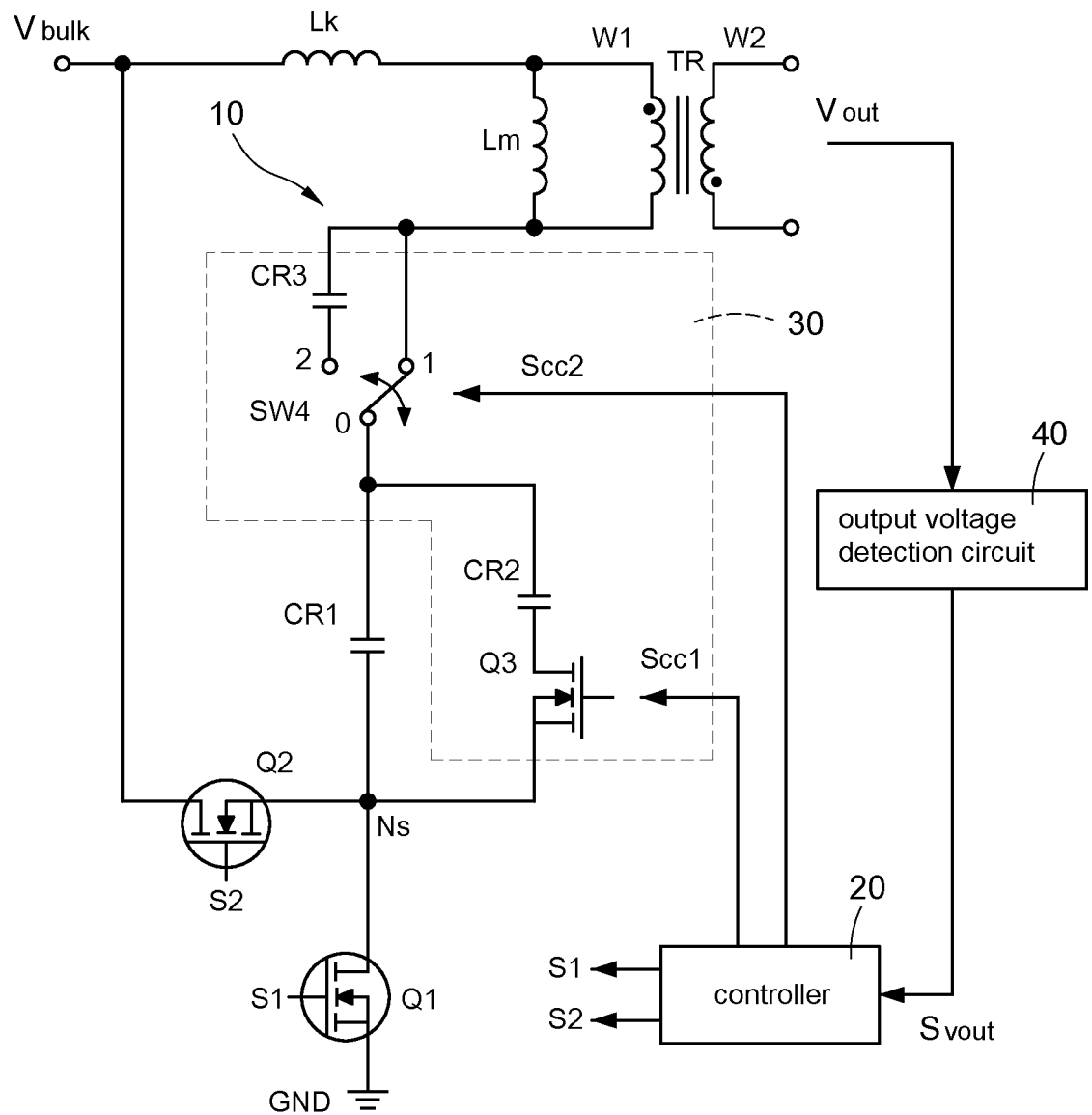
FIG. 4 is a circuit diagram of the capacitance adjustment circuit of the power converter according to a third embodiment of the present disclosure.

Please refer to FIG. 4, which shows a circuit diagram of the capacitance adjustment circuit of the power converter according to a third embodiment of the present disclosure. The capacitance adjustment circuit 30 includes a second capacitor CR2, a third capacitor CR3, a third switch Q3, and a fourth switch SW4. The second capacitor CR2 and the third capacitor CR3 are used as the adjustment capacitor. The third switch Q3 is connected to the second capacitor CR2 in series to form a series-connected path, wherein the series-connected path is connected to the resonant capacitor CR1 in parallel. The fourth switch SW4 includes a common end 0, a first switching end 1, and a second switching end 2. The common end 0 is connected to the resonant capacitor CR1 and the second capacitor CR2, the first switching end 1 is connected to one end (near to the magnetizing inductance Lm) of the third capacitor CR3, and the second switching end 2 is connected to the other end (away from the magnetizing inductance Lm) of the third capacitor CR3.

When the third switch Q3 is turned off by a first capacitance adjustment signal Scc1 and the common end 0 of the fourth switch SW4 is connected to the first switching end 1 of the fourth switch SW4 by a second capacitance adjustment signal Scc2, and the resonant circuit 10 is in a resonance operation (however, this is not a limitation, and only the resonance operation of the resonant circuit 10 is executed as an example for illustration), a first equivalent resonant capacitance is equal to a capacitance of the resonant capacitor CR1, and a resonant current flows through the resonant capacitor CR1.

When the third switch Q3 is turned off by the first capacitance adjustment signal Scc1 and the common end 0 of the fourth switch SW4 is connected to the second switching end 2 of the fourth switch SW4 by the second capacitance adjustment signal Scc2, and the resonant circuit 10 is in the resonance operation, a second equivalent resonant capacitance is equal to an equivalent capacitance of the resonant capacitor CR1 and the third capacitor CR3 in series, and the resonant current respectively flows through the third capacitor CR3 and the resonant capacitor CR1.

When the third switch Q3 is turned on by the first capacitance adjustment signal Scc1 and the common end 0 of the fourth switch SW4 is connected to the first switching end 1 of the fourth switch SW4 by the second capacitance adjustment signal Scc2, and the resonant circuit 10 is in the resonance operation, a third equivalent resonant capacitance is equal to an equivalent capacitance of the resonant capacitor CR1 and the second capacitor CR2 in parallel, and the resonant current respectively flows through the resonant capacitor CR1 and the second capacitor CR2.

When the third switch Q3 is turned on by the first capacitance adjustment signal Scc1 and the common end 0 of the fourth switch SW4 is connected to the second switching end 2 of the fourth switch SW4 by the second capacitance adjustment signal Scc2, and the resonant circuit 10 is in the resonance operation, a fourth equivalent resonant capacitance is equal to an equivalent capacitance of the resonant capacitor CR1 and the second capacitor CR2 in parallel and then the third capacitor CR3 in series, and the resonant current flows through the third capacitor CR3 and respectively flows through the resonant capacitor CR1 and the second capacitor CR2.

For the convenience of explanation, in this embodiment, it is assumed that the capacitance of the resonant capacitor CR1, a capacitance of the second capacitor CR2, and a capacitance of the third capacitor CR3 are the same, and therefore the third equivalent resonant capacitance (i.e., CR1/CR2) is greater than the first equivalent resonant capacitance (i.e., CR1), the first equivalent resonant capacitance is greater than the fourth equivalent resonant capacitance (i.e., (CR1/CR2)+CR3), the fourth equivalent resonant capacitance is greater than the second equivalent resonant capacitance (i.e., CR1+CR3).

When the output voltage Vout is less than a first voltage threshold, the equivalent capacitance of the resonant circuit 10 is equal to the third equivalent resonant capacitance. When the output voltage Vout is greater than the first voltage threshold and is less than a second voltage threshold, the equivalent capacitance of the resonant circuit 10 is equal to the first equivalent resonant capacitance. When the output voltage Vout is greater than the second voltage threshold and is less than a third voltage threshold, the equivalent capacitance of the resonant circuit 10 is equal to the fourth equivalent resonant capacitance. When the output voltage Vout is greater than the third voltage threshold, the equivalent capacitance of the resonant circuit 10 is equal to the second equivalent resonant capacitance. Therefore, the equivalent capacitance of the resonant circuit 10 can be adjusted in real time in response to the output voltage Vout: when the output voltage Vout becomes larger, the capacitance of the resonant capacitor is adjusted to be smaller; when the output voltage Vout becomes smaller, the capacitance of the resonant capacitor is adjusted to be larger, thereby increasing efficiency, reducing the voltage surge on the resonant capacitor, and reducing the current flowing through the transistors to avoid damage to the transistors.

Figure 5:
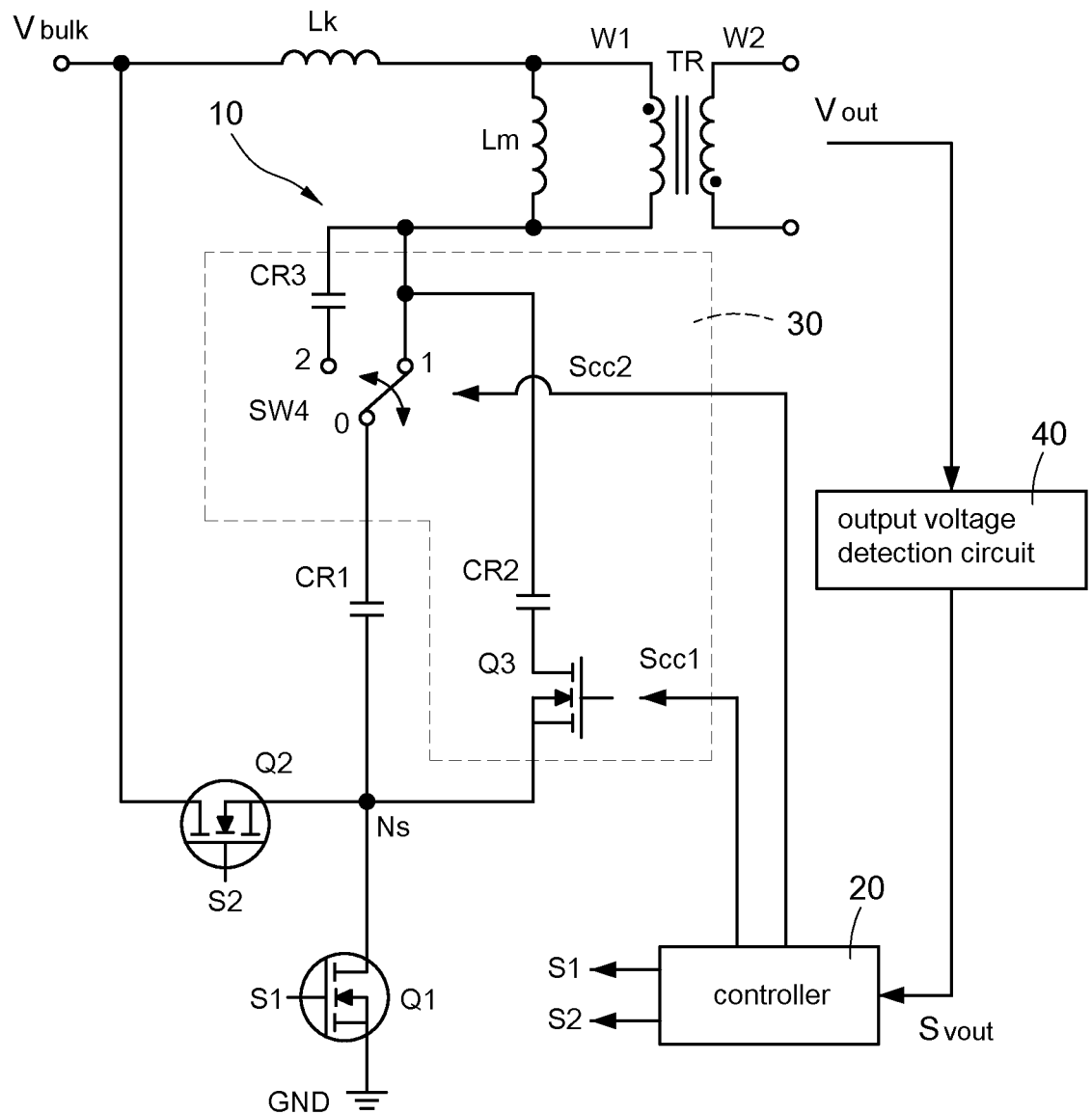
FIG. 5 is a circuit diagram of the capacitance adjustment circuit of the power converter according to a fourth embodiment of the present disclosure.

Please refer to FIG. 5, which shows a circuit diagram of the capacitance adjustment circuit of the power converter according to a fourth embodiment of the present disclosure. The capacitance adjustment circuit 30 includes a second capacitor CR2 and a third capacitor C3, a fourth switch SW4, and a third switch Q3. The second capacitor CR2 and the third capacitor CR3 are used as the adjustment capacitor. The fourth switch SW4 includes a common end 0, a first switching end 1, and a second switching end 2. The common end 0 is connected to the resonant capacitor CR1, the first switching end 1 is connected to one end (near to the magnetizing inductance Lm) of the third capacitor CR3, and the second switching end 2 is connected to the other end (away from the magnetizing inductance Lm) of the third capacitor CR3.

The third switch Q3 is connected to the second capacitor CR2 in series to form a series-connected path, wherein one end (away from the magnetizing inductance Lm) of the series-connected path is connected to the resonant capacitor CR1, and the other end (near to the magnetizing inductance Lm) of the series-connected path is connected to the first switching end 1 and the third capacitor CR3.

When the third switch Q3 is turned off by the first capacitance adjustment signal Scc1 and the common end 0 of the fourth switch SW4 is connected to the first switching end 1 of the fourth switch SW4 by the second capacitance adjustment signal Scc2, and the resonant circuit 10 is in a resonance operation (however, this is not a limitation, and only the resonance operation of the resonant circuit 10 is executed as an example for illustration), a first equivalent resonant capacitance is equal to a capacitance of the resonant capacitor CR1, and a resonant current flows through the resonant capacitor CR1.

When the third switch Q3 is turned off by the first capacitance adjustment signal Scc1 and the common end 0 of the fourth switch SW4 is connected to the second switching end 2 of the fourth switch SW4 by the second capacitance adjustment signal Scc2, and the resonant circuit 10 is in the resonance operation, a second equivalent resonant capacitance is equal to an equivalent capacitance of the resonant capacitor CR1 and the third capacitor CR3 in series, and the resonant current respectively flows through the third capacitor CR3 and the resonant capacitor CR1.

When the third switch Q3 is turned on by the first capacitance adjustment signal Scc1 and the common end 0 of the fourth switch SW4 is connected to the first switching end 1 of the fourth switch SW4 by the second capacitance adjustment signal Scc2, and the resonant circuit 10 is in the resonance operation, a third equivalent resonant capacitance is equal to an equivalent capacitance of the resonant capacitor CR1 and the second capacitor CR2 in parallel, and the resonant current respectively flows through the resonant capacitor CR1 and the second capacitor CR2.

When the third switch Q3 is turned on by the first capacitance adjustment signal Scc1 and the common end 0 of the fourth switch SW4 is connected to the second switching end 2 of the fourth switch SW4 by the second capacitance adjustment signal Scc2, and the resonant circuit 10 is in the resonance operation, a fourth equivalent resonant capacitance is equal to an equivalent capacitance of the resonant capacitor CR1 and the third capacitor CR3 in series and then the second capacitor CR2 in parallel, and the resonant current respectively flows through the third capacitor CR3 and the resonant capacitor CR1, and the second capacitor CR2.

For the convenience of explanation, in this embodiment, it is assumed that the capacitance of the resonant capacitor CR1, a capacitance of the second capacitor CR2, and a capacitance of the third capacitor CR3 are the same, and therefore the third equivalent resonant capacitance (i.e., CR1/CR2) is greater than the fourth equivalent resonant capacitance (i.e., (CR1+CR3)/CR2), the fourth equivalent resonant capacitance is greater than the first equivalent resonant capacitance (i.e., CR1), the first equivalent resonant capacitance is greater than the second equivalent resonant capacitance (i.e., CR1+CR3).

When the output voltage Vout is less than a first voltage threshold, the equivalent capacitance of the resonant circuit 10 is equal to the third equivalent resonant capacitance. When the output voltage Vout is greater than the first voltage threshold and is less than a second voltage threshold, the equivalent capacitance of the resonant circuit 10 is equal to the fourth equivalent resonant capacitance. When the output voltage Vout is greater than the second voltage threshold and is less than a third voltage threshold, the equivalent capacitance of the resonant circuit 10 is equal to the first equivalent resonant capacitance. When the output voltage Vout is greater than the third voltage threshold, the equivalent capacitance of the resonant circuit 10 is equal to the second equivalent resonant capacitance. Therefore, the equivalent capacitance of the resonant circuit 10 can be adjusted in real time in response to the output voltage Vout: when the output voltage Vout becomes larger, the capacitance of the resonant capacitor is adjusted to be smaller; when the output voltage Vout becomes smaller, the capacitance of the resonant capacitor is adjusted to be larger, thereby increasing efficiency, reducing the voltage surge on the resonant capacitor, and reducing the current flowing through the transistors to avoid damage to the transistors.

In summary, the present disclosure has the following features and advantages:

1. Since the capacitance of a single resonant capacitor cannot be compatible with the capacitance required by all output voltages, the capacitance adjustment circuit is used to adjust the required capacitance. After the output voltage is detected (that is, the output voltage is known), the capacitance adjustment circuit can be used to connect with the resonant capacitor in parallel, in series, in parallel-series, or in series-parallel to change the equivalent capacitance of the resonant circuit so that the equivalent capacitance of the resonant capacitor required under the output voltage can be designed according to different output voltages.

2. According to the magnitude of the output voltage, the equivalent capacitance of the resonant circuit can be adjusted in real time to have a normal resonant waveform, thereby increasing efficiency, reducing the voltage surge on the resonant capacitor, and reducing the current flowing through the transistors to avoid damage to the transistors.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter, comprising:
    a transformer, comprising a primary-side winding and a secondary-side winding coupled to the primary-side winding,
    a resonant circuit, coupled to the primary-side winding, the resonant circuit comprising a resonant capacitor and a resonant inductor, wherein the resonant inductor is composed of a magnetizing inductance and a leakage inductance of the primary-side winding,
    a first switch and a second switch, coupled to the resonant circuit,
    a capacitance adjustment circuit, comprising:
        an adjustment capacitor, coupled to the resonant capacitor,
        a second capacitor and a third capacitor, are configured to be the adjustment capacitor,
        a third switch, connected to the second capacitor in series to form a series-connected path, wherein the series-connected path is connected to the resonant capacitor in parallel, and
        a fourth switch, comprising a common end, a first switching end, and a second switching end; wherein the common end is connected to the resonant capacitor and the second capacitor, the first switching end is connected to one end of the third capacitor, and the second switching end is connected to the other end of the third capacitor, and
    a controller, configured to receive an output voltage feedback signal corresponding to an output voltage of the power converter, and control the first switch and the second switch to be alternately turned on and turned off according to the output voltage feedback signal so as to adjust the output voltage,
    wherein the controller is configured to control a connection relationship between the adjustment capacitor and the resonant capacitor according to the output voltage feedback signal so as to determine an equivalent resonant capacitance of the resonant circuit,
    wherein when the third switch is turned off and the common end of the fourth switch is connected to the first switching end of the fourth switch, and the resonant circuit is in a resonance operation, a first equivalent resonant capacitance is equal to a capacitance of the resonant capacitor, and a resonant current flows through the resonant capacitor,
    wherein when the third switch is turned off and the common end of the fourth switch is connected to the second switching end of the fourth switch, and the resonant circuit is in the resonance operation, a second equivalent resonant capacitance is equal to an equivalent capacitance of the resonant capacitor and the third capacitor in series, and the resonant current respectively flows through the third capacitor and the resonant capacitor, wherein when the third switch is turned on and the common end of the fourth switch is connected to the first switching end of the fourth switch, and the resonant circuit is in the resonance operation, a third equivalent resonant capacitance is equal to an equivalent capacitance of the resonant capacitor and the second capacitor in parallel, and the resonant current respectively flows through the resonant capacitor and the second capacitor, wherein when the third switch is turned on and the common end of the fourth switch is connected to the second switching end of the fourth switch, and the resonant circuit is in the resonance operation, a fourth equivalent resonant capacitance is equal to an equivalent capacitance of the resonant capacitor and the second capacitor in parallel and then the third capacitor in series, and the resonant current flows through the third capacitor and respectively flows through the resonant capacitor and the second capacitor.

2. The power converter as claimed in claim 1, wherein when the output voltage increases, the equivalent resonant capacitance is controlled to be decreased; when the output voltage decreases, the equivalent resonant capacitance is controlled to be increased.

3. The power converter as claimed in claim 1, wherein the controller is configured to provide a first signal, a second signal, and a capacitance adjustment signal to respectively control the first switch, the second switch, and the capacitance adjustment circuit.

4. The power converter as claimed in claim 1, wherein when the capacitance of the resonant capacitor, a capacitance of the second capacitor, and a capacitance of the third capacitor are the same, the third equivalent resonant capacitance is greater than the first equivalent resonant capacitance, the first equivalent resonant capacitance is greater than the fourth equivalent resonant capacitance, the fourth equivalent resonant capacitance is greater than the second equivalent resonant capacitance, wherein when the output voltage is less than a first voltage threshold, the equivalent capacitance of the resonant circuit is equal to the third equivalent resonant capacitance; when the output voltage is greater than the first voltage threshold and is less than a second voltage threshold, the equivalent capacitance of the resonant circuit is equal to the first equivalent resonant capacitance; when the output voltage is greater than the second voltage threshold and is less than a third voltage threshold, the equivalent capacitance of the resonant circuit is equal to the fourth equivalent resonant capacitance; when the output voltage is greater than the third voltage threshold, the equivalent capacitance of the resonant circuit is equal to the second equivalent resonant capacitance.

5. The power converter as claimed in claim 1, wherein the transformer further comprises an auxiliary winding, wherein a turns ratio relationship is between the secondary-side winding and the auxiliary winding, and the auxiliary winding is configured to provide an auxiliary voltage that has the turns ratio relationship with the output voltage, wherein the controller is configured to receive an auxiliary voltage feedback signal corresponding to the auxiliary voltage, and control the first switch and the second switch to be alternately turned on and turned off according to the auxiliary voltage feedback signal so as to adjust the output voltage.

6. The power converter as claimed in claim 1, further comprising: an output voltage detection circuit, configured to receive the output voltage and detect the output voltage, and generate the output voltage feedback signal corresponding to the output voltage.

7. The power converter as claimed in claim 1, wherein the capacitance adjustment circuit comprises:
a second capacitor, is configured to be the adjustment capacitor, and
a third switch, connected to the second capacitor in series to form a series-connected path, wherein the series-connected path is connected to the resonant capacitor in parallel.

8. The power converter as claimed in claim 7, wherein when the third switch is turned off and the resonant circuit is in a resonance operation, a first equivalent resonant capacitance is equal to a capacitance of the resonant capacitor, and a resonant current flows through the resonant capacitor, wherein when the third switch is turned on and the resonant circuit is in the resonance operation, a second equivalent resonant capacitance is equal to an equivalent capacitance of the resonant capacitor and the second capacitor in parallel, and the resonant current respectively flows through the resonant capacitor and the second capacitor.

9. The power converter as claimed in claim 8, wherein when the capacitance of the resonant capacitor and a capacitance of the second capacitor are the same, the second equivalent resonant capacitance is greater than the first equivalent resonant capacitance, wherein when the output voltage is less than a voltage threshold, the equivalent capacitance of the resonant circuit is equal to the second equivalent resonant capacitance; when the output voltage is greater than the voltage threshold, the equivalent capacitance of the resonant circuit is equal to the first equivalent resonant capacitance.

10. The power converter as claimed in claim 1, wherein the capacitance adjustment circuit comprises:
a third capacitor, is configured to be the adjustment capacitor, and
a fourth switch, comprising a common end, a first switching end, and a second switching end; wherein the common end is connected to the resonant capacitor, the first switching end is connected to one end of the third capacitor, and the second switching end is connected to the other end of the third capacitor.

11. The power converter as claimed in claim 10, wherein when the common end of the fourth switch is connected to the first switching end of the fourth switch and the resonant circuit is in a resonance operation, a first equivalent resonant capacitance is equal to a capacitance of the resonant capacitor, and a resonant current flows through the resonant capacitor, wherein when the common end of the fourth switch is connected to the second switching end of the fourth switch and the resonant circuit is in the resonance operation, a second equivalent resonant capacitance is equal to an equivalent capacitance of the resonant capacitor and the third capacitor in series, and the resonant current respectively flows through the third capacitor and the resonant capacitor.

12. The power converter as claimed in claim 11, wherein when the capacitance of the resonant capacitor and a capacitance of the third capacitor are the same, the first equivalent resonant capacitance is greater than the second equivalent resonant capacitance, wherein when the output voltage is less than a voltage threshold, the equivalent capacitance of the resonant circuit is equal to the first equivalent resonant capacitance; when the output voltage is greater than the voltage threshold, the equivalent capacitance of the resonant circuit is equal to the second equivalent resonant capacitance.

13. The power converter as claimed in claim 1, wherein the capacitance adjustment circuit comprises:
   a second capacitor and a third capacitor, are configured to be the adjustment capacitor,
   a fourth switch, comprising a common end, a first switching end, and a second switching end; wherein the common end is connected to the resonant capacitor, the first switching end is connected to one end of the third capacitor, and the second switching end is connected to the other end of the third capacitor, and
   a third switch, connected to the second capacitor in series to form a series-connected path, wherein one end of the series-connected path is connected to the resonant capacitor, and the other end of the series-connected path is connected to the first switching end and the third capacitor.

14. The power converter as claimed in claim 13, wherein when the third switch is turned off and the common end of the fourth switch is connected to the first switching end of the fourth switch, and the resonant circuit is in a resonance operation, a first equivalent resonant capacitance is equal to a capacitance of the resonant capacitor, and a resonant current flows through the resonant capacitor,
   wherein when the third switch is turned off and the common end of the fourth switch is connected to the second switching end of the fourth switch, and the resonant circuit is in the resonance operation, a second equivalent resonant capacitance is equal to an equivalent capacitance of the resonant capacitor and the third capacitor in series, and the resonant current respectively flows through the third capacitor and the resonant capacitor,
   wherein when the third switch is turned on and the common end of the fourth switch is connected to the first switching end of the fourth switch, and the resonant circuit is in the resonance operation, a third equivalent resonant capacitance is equal to an equivalent capacitance of the resonant capacitor and the second capacitor in parallel, and the resonant current respectively flows through the resonant capacitor and the second capacitor,
   wherein when the third switch is turned on and the common end of the fourth switch is connected to the second switching end of the fourth switch, and the resonant circuit is in the resonance operation, a fourth equivalent resonant capacitance is equal to an equivalent capacitance of the resonant capacitor and the third capacitor in series and then the second capacitor in parallel, and the resonant current respectively flows through the third capacitor and the resonant capacitor, and the second capacitor.

15. The power converter as claimed in claim 14, wherein when the capacitance of the resonant capacitor, a capacitance of the second capacitor, and a capacitance of the third capacitor are the same, the third equivalent resonant capacitance is greater than the fourth equivalent resonant capacitance, the fourth equivalent resonant capacitance is greater than the first equivalent resonant capacitance, the first equivalent resonant capacitance is greater than the second equivalent resonant capacitance,
   wherein when the output voltage is less than a first voltage threshold, the equivalent capacitance of the resonant circuit is equal to the third equivalent resonant capacitance; when the output voltage is greater than the first voltage threshold and is less than a second voltage threshold, the equivalent capacitance of the resonant circuit is equal to the fourth equivalent resonant capacitance; when the output voltage is greater than the second voltage threshold and is less than a third voltage threshold, the equivalent capacitance of the resonant circuit is equal to the first equivalent resonant capacitance; when the output voltage is greater than the third voltage threshold, the equivalent capacitance of the resonant circuit is equal to the second equivalent resonant capacitance.

* * * * *